US012555953B2

(12) United States Patent
Cao et al.

(10) Patent No.: US 12,555,953 B2
(45) Date of Patent: Feb. 17, 2026

(54) ELECTRICAL CONNECTOR WITH IMPROVED POSITIONING STRUCTURE AND ELECTRICAL CONNECTOR ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Qin-Xin Cao, Kunshan (CN); Zhi-Fu Ma, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 345 days.

(21) Appl. No.: 18/175,528

(22) Filed: Feb. 27, 2023

(65) Prior Publication Data

US 2023/0283011 A1 Sep. 7, 2023

(30) Foreign Application Priority Data

Mar. 4, 2022 (CN) ........................ 202220460593.X

(51) Int. Cl.
*H01R 13/627* (2006.01)
*H01R 12/72* (2011.01)
*H01R 13/639* (2006.01)

(52) U.S. Cl.
CPC ....... *H01R 13/6273* (2013.01); *H01R 12/721* (2013.01); *H01R 13/639* (2013.01)

(58) Field of Classification Search
CPC . H01R 13/6273; H01R 13/639; H01R 12/721
USPC .................................................. 439/140, 637
See application file for complete search history.

(56) References Cited

U.S. PATENT DOCUMENTS 4,905,122 A * 2/1990 Culnan .................. H02B 1/056 439/813
5,093,215 A * 3/1992 Hasegawa ........... H01M 50/567 439/813
6,361,382 B1 * 3/2002 Yamada ................. H01R 4/302 439/813
2012/0088375 A1 * 4/2012 Fu .......................... H01R 27/00 439/62
2016/0036163 A1 * 2/2016 Ebisawa .............. H01R 13/436 439/358

FOREIGN PATENT DOCUMENTS

CN 212725805 U 3/2021

* cited by examiner

*Primary Examiner* — Gary F Paumen
(74) *Attorney, Agent, or Firm* — Ming Chieh Chang

(57) ABSTRACT

An electrical connector for receiving an electronic device defining a mating plate with conductive pads and a positioning plate includes: a connector housing defining a mating slot opening forward and terminal grooves on opposite sides of the mating slot, plural conductive terminals, and a positioning portion surrounding the connector housing. Each conductive terminal has a resilient arm received in the terminal groove. The positioning portion is spaced from the connector housing by a positioning slot. The positioning slot is used for insertion of the positioning plate of the electronic device.

16 Claims, 10 Drawing Sheets

ELECTRICAL CONNECTOR WITH IMPROVED POSITIONING STRUCTURE AND ELECTRICAL CONNECTOR ASSEMBLY

BACKGROUND OF THE INVENTION

Field of the Invention

The present invention relates to an electrical connector and an assembly of the same, more particularly to an electrical connector with positioning structure.

Description of Related Arts

China Patent No. CN212725805U discloses an electrical connector assembly which includes an electrical connector and a shell surrounding the electrical connector. The electrical connector is used for connecting electrically with an electronic system such as an SSD. The shell includes a positioning mechanism for positioning with the electronic system and is assembled with a locking member for being clamped to the electronic system. However, due to the two-piece structure of the electrical connector and the shell, a slight shift in their relative position will have an adverse effect on the docking between the electrical connector assembly and the electronic system, which in turn affects the quality of signal transmission.

Hence, a new electrical connector is desired.

SUMMARY OF THE INVENTION

An electrical connector adaptor for receiving an electronic device defining mating plate with conductive pads and a positioning plate comprises a connector housing defining a mating slot opening forward and terminal grooves on opposite sides of the mating slot; and a plurality of conductive terminals and a positioning portion surrounding the connector housing. The plurality of conductive terminals comprise resilient arms receiving in the terminal grooves and with contacting portion protruding, and contacting portions at distal ends of the resilient arms. The positioning portion spaces from the connector housing with a positioning slot. The positioning slot is used for an insertion of the positioning plate of the electronic device.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
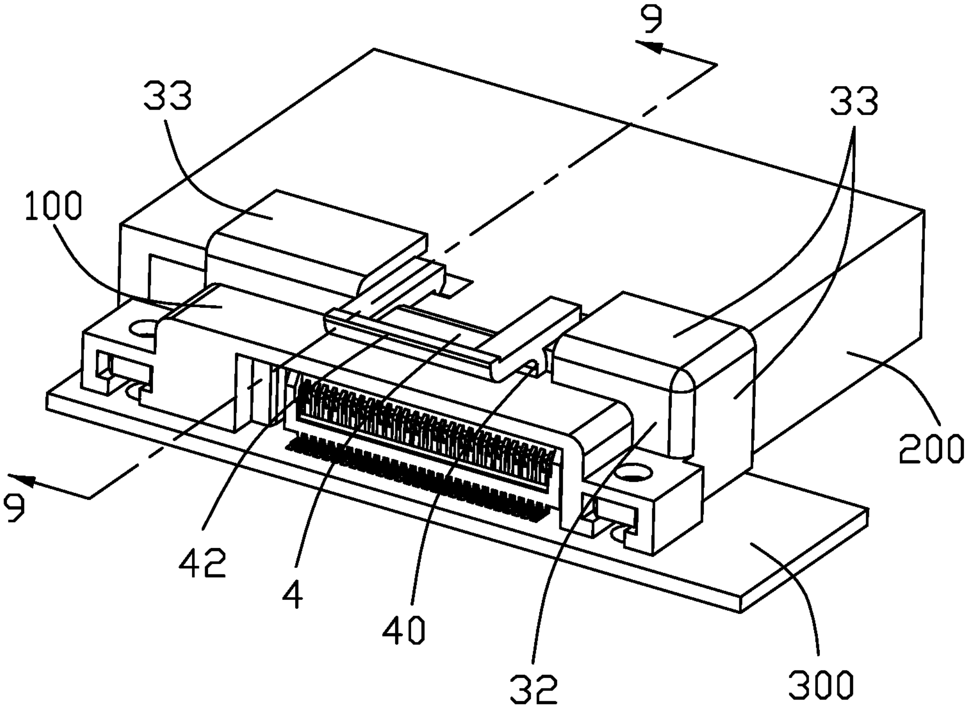
FIG. 1 is a perspective view of an electrical connector mounted on a printed circuit board (PCB) and mating with an electronic device of an embodiment of the present invention.
Figure 2:
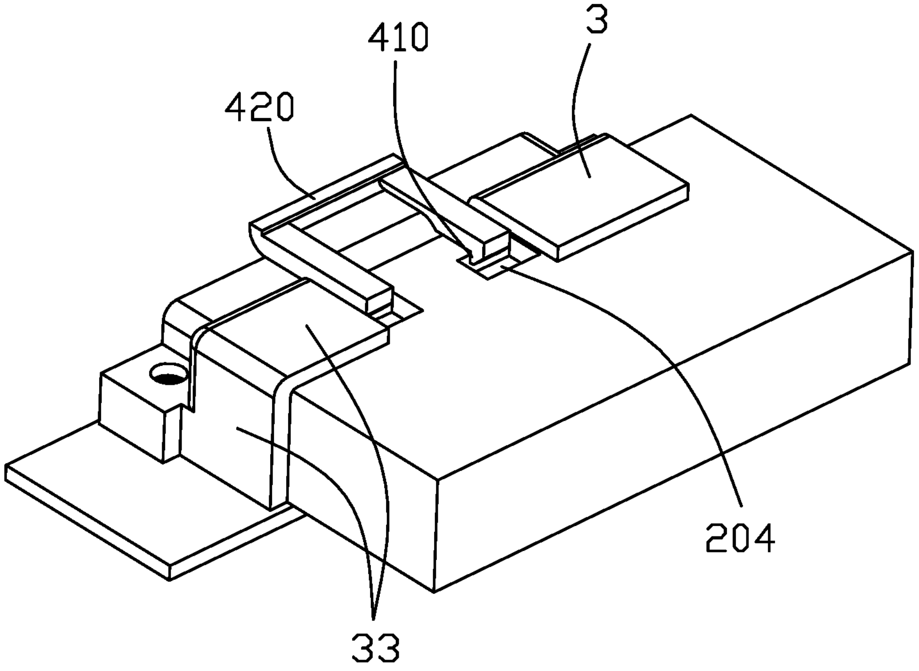
FIG. 2 is another perspective view of the electrical connector in FIG. 1.

Reference will now be made in detail to the preferred embodiments of the present invention.

Referring to FIGS. 1-4, an electrical connector assembly comprises an electrical connector 100 mounted on a printed circuit board (PCB) 300 and an electronic device 200 which is inserted into the electrical connector 100 to establish an electric path between the electronic device 200 and PCB 300. The electronic device 200 may be a device such as a solid state disk. The electrical connector 100 electrically connects between the electronic device 200 and the printed circuit board 300. The electronic device 200 comprises a mating plate 201 equipped with conductive pads 203 (labeled in FIG. 9) and a positioning plate 202 with locking holes 204. Referring to FIGS. 5-10, the electrical connector 100 comprises a connector housing 1 and a plurality of conductive terminals 2. The connector housing 1 comprises a mating slot 10 opening forward and defining terminal grooves 11 on opposite sides of the mating slot 10. The mating plate 201 is inserted into the mating slot 10 and contacts the conductive terminals 2. The plurality of conductive terminals 2 comprises resilient arms 20 extending into the mating slot 10 through the terminal grooves 11, and contacting portions 21 located at the free ends of the resilient arms 20 and contacting to the conductive pads 203. The electrical connector 100 comprises a positioning portion 3 surrounding the connector housing 1 and a positioning slot 31 formed between the positioning portion 3 and the connector housing 1, the positioning slot 31 is used for the insertion of the positioning plate 202. This is beneficial to an accurate alignment of the electronic device 20 to the electrical connector 100, and is beneficial to a stable transmission of electrical signals.

Figure 9:
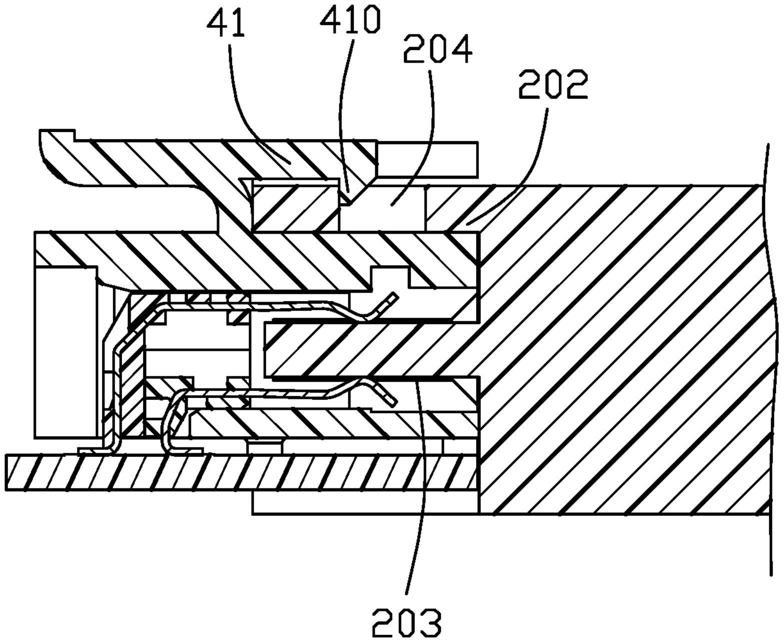
FIG. 9 is a cross-sectional view of the electrical connector in FIG. 1 taken along lines 9-9.

The positioning portion 3 defines an opening 30. The electrical connector 100 comprises a locking portion 4 located in the opening 30. The locking portion 4 has a pair of cantilevers 41 with a hook portion 410 protruding downwards from a free end of each cantilever. Referring to FIG. 9, the hook portions 410 are used to hold in the locking holes 204 of the electronic device 200, thereby preventing the electrical connector 100 from removing from the electronic device 200.

Figure 3:
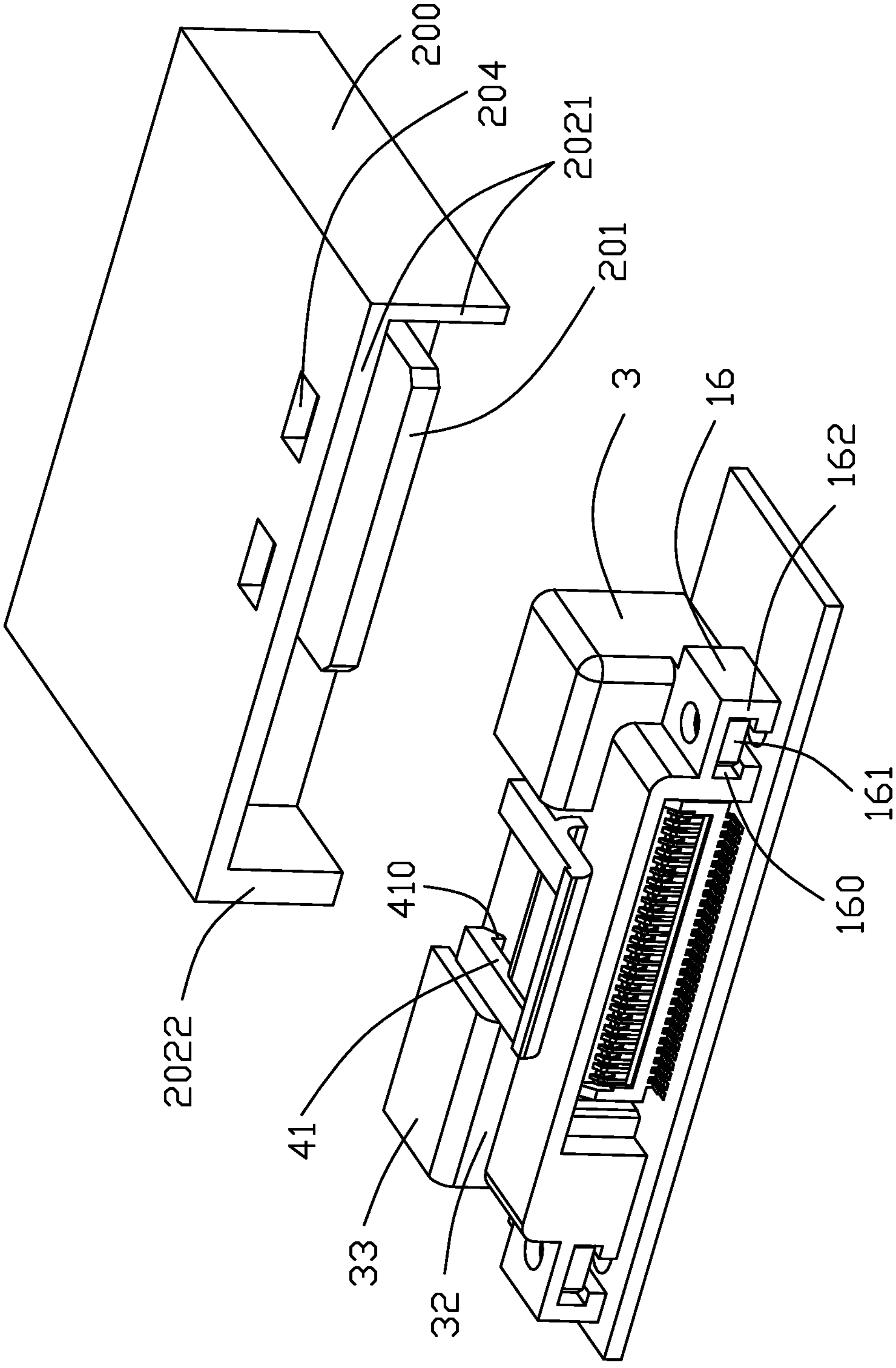
FIG. 3 is a perspective view of the electrical connector on the PCB and disconnecting from the electronic device in FIG. 1.
Figure 4:
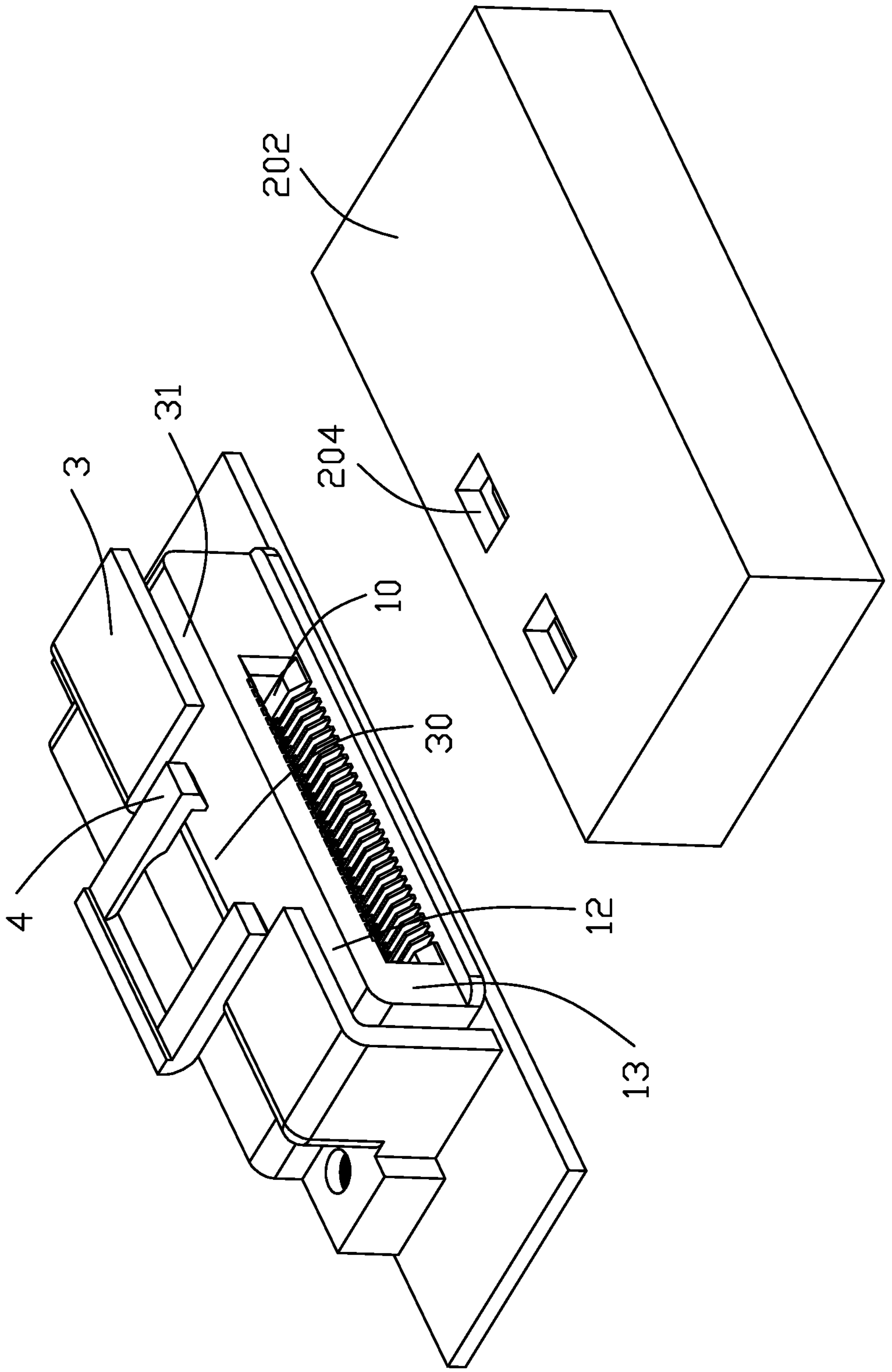
FIG. 4 is another perspective view of the electrical connector in FIG. 3.
Figure 5:
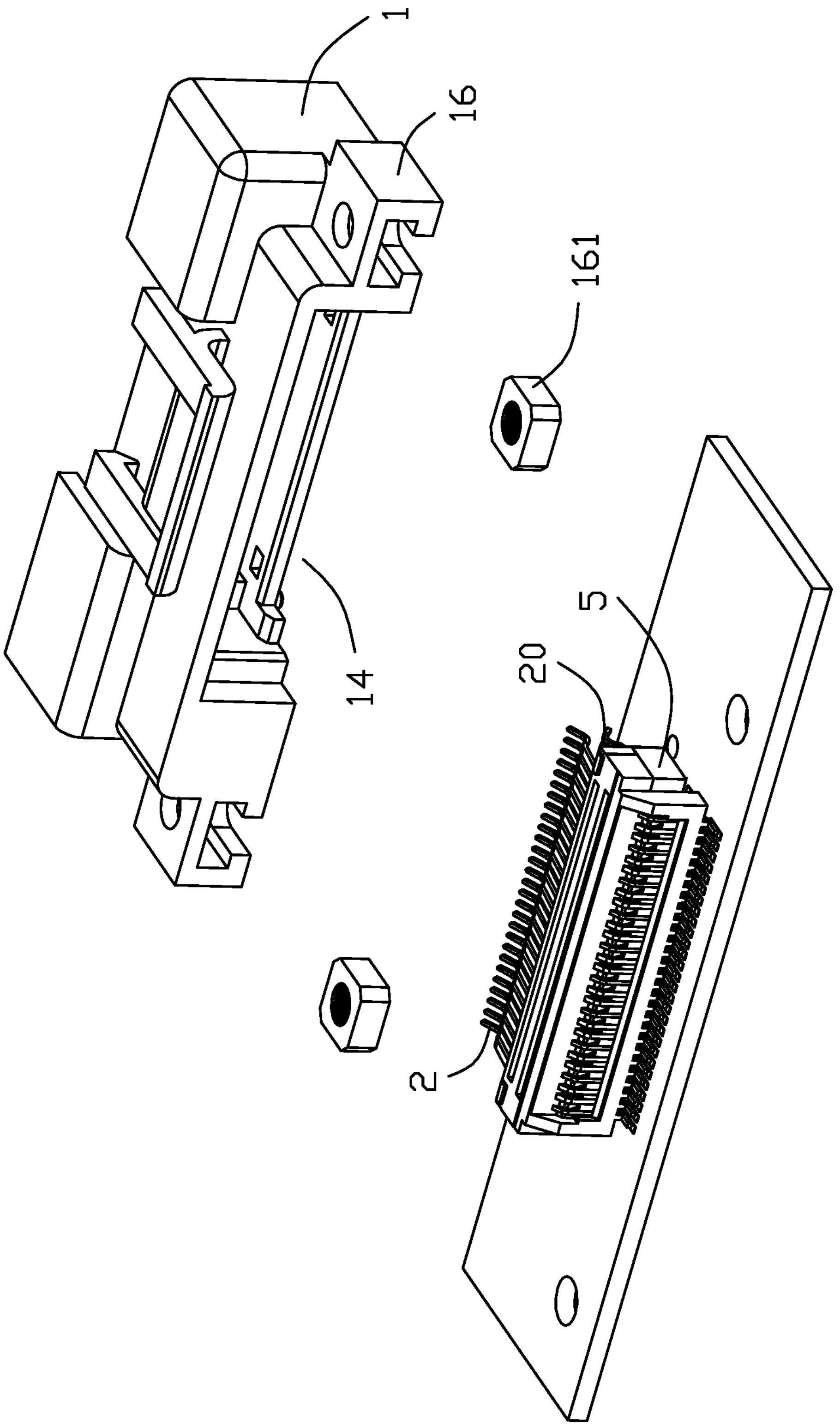
FIG. 5 is an exploded perspective view of the electrical connector in FIG. 3, wherein terminal modules are mounted on the PCB.
Figure 6:
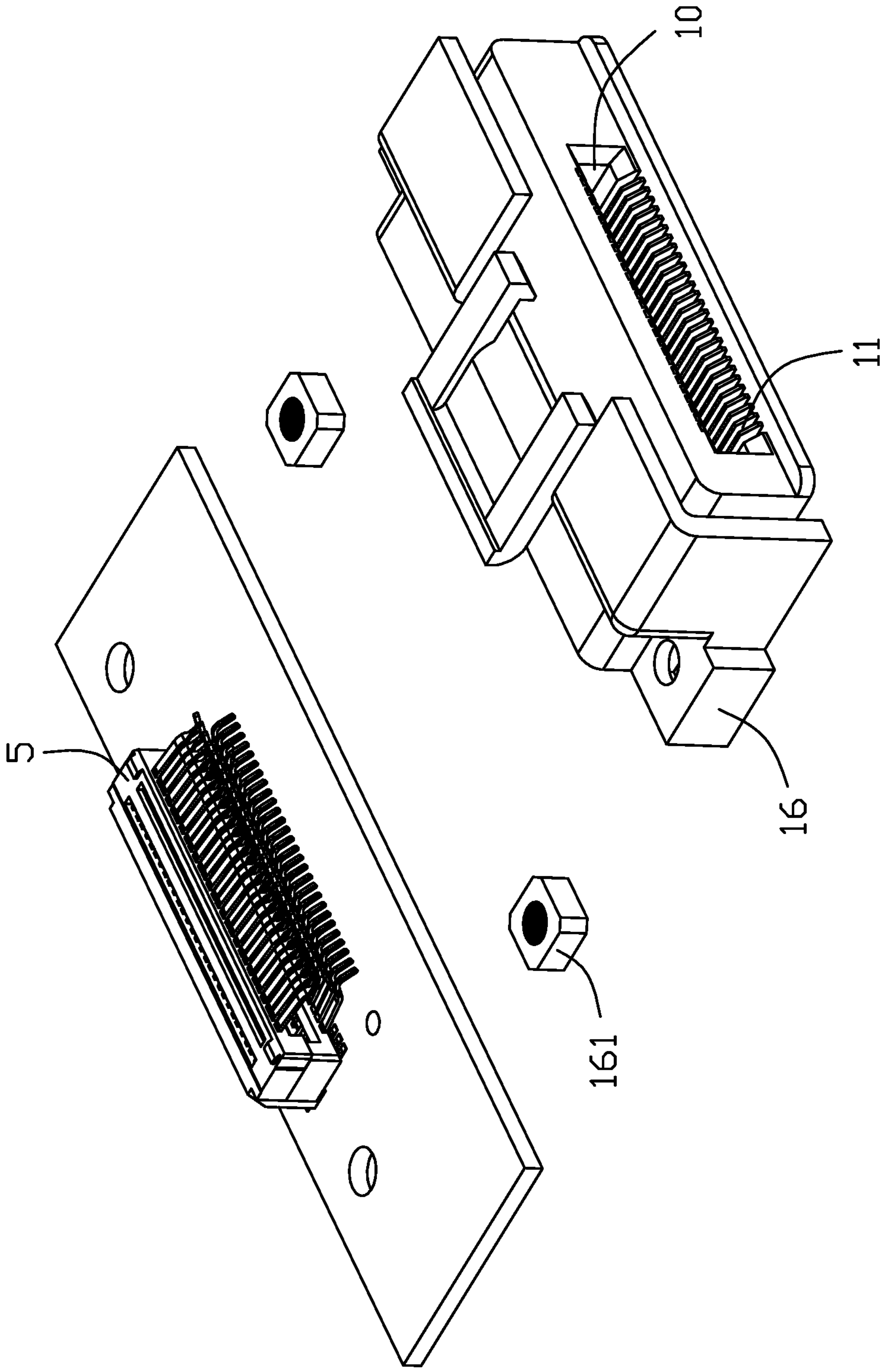
FIG. 6 is another perspective view of the electrical connector in FIG. 5.
Figure 7:
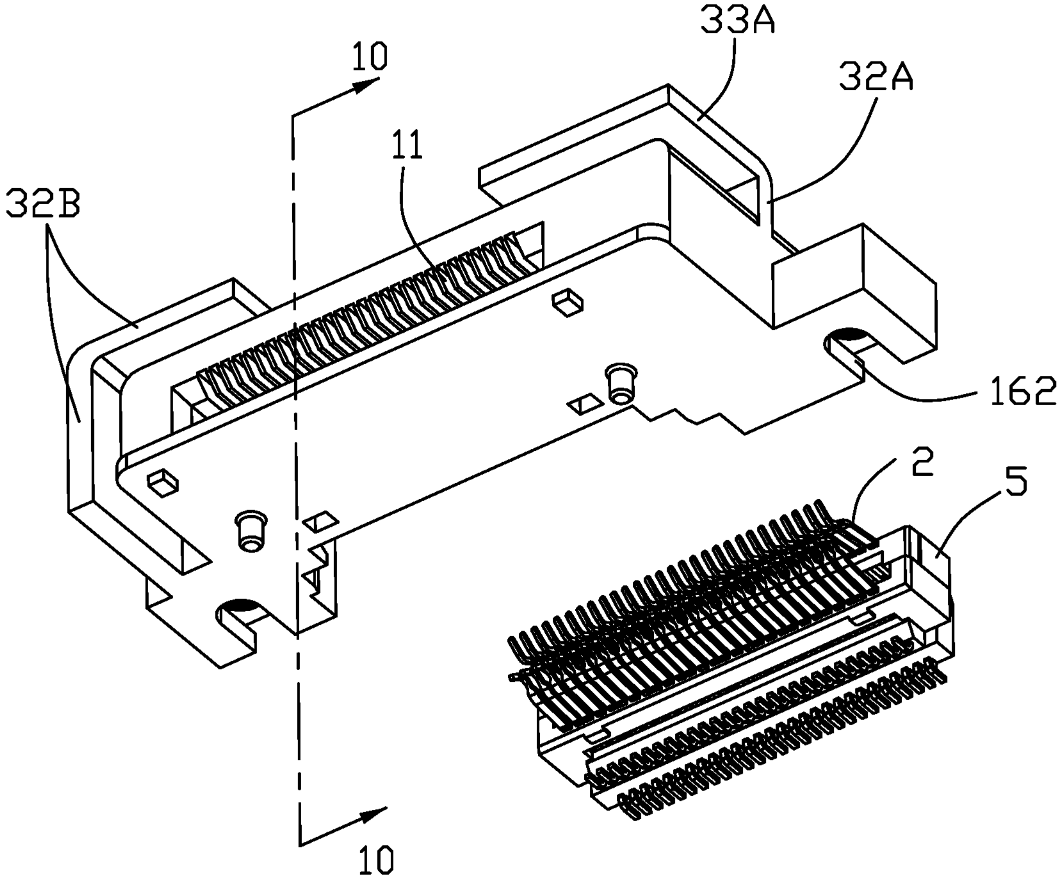
FIG. 7 is an exploded perspective view of the electrical connector in FIG. 3.

As shown in FIGS. 3-4, the connector housing 1 has a top wall 12 parallel to the mating slot 10, a bottom wall and two opposite end wall 13 connected to two ends of the top wall 12 and commonly defining the mating slot 10. The positioning portion 3 comprises a vertical portion 32 extending integrally from the top wall 12 and the end wall 13 and a horizontal portion 33 extending integrally forward from the vertical portion 32. The positioning slot 31 is located between the horizontal portion 33 and the top wall 12 or between the horizontal portion 33 and the end walls 13. Referring to FIG. 7, in this embodiment, the vertical portion 32A at one side of the opening 30 only extends from the top wall 12, the corresponding horizontal portion 33A is parallel to the top wall 12. The vertical portion 32 on another side of the opening 30 extends integrally both from the top wall 12 and the end wall 13. The corresponding horizontal portion 33B is arranged in an inverted "L" shape parallel to both the top wall 12 and the end wall 13. The positioning slot 31 is located around the top wall and one end wall of the connector housing 1, and opens forward to an exterior and laterally one side of the connector housing. The positioning plate 202 of the electronic device 200 has only two continuous sides 2021 limited within the positioning slot 31. In this way, a third side 2022 of the electronic device 200 is not limited and has more space in the design of the structure, which is beneficial to adapt to the structural requirements of different electronic devices.

Referring to FIGS. 3-4, the locking portion 4 comprises a pivot portion 40 extending integrally upward from the top wall 12 and a pressing portion 42. The cantilevers 41 extend forwards from the pivot portion and the pressing portion extends rearward from the pivot portion 40. The pivot portion 40 and the vertical portion 32 are located in a same straight line. The pressing portion 42 and the cantilevers 41 are separated from the top wall 12 by a distance in a vertical direction, both. The pair of cantilever arms 41 are spaced apart from each other in the transverse direction perpendicular to the vertical direction, which is beneficial to further increase an engagement stability between the electrical connector 100 and the electronic device 200. The pressing portion 42 is of a plate structure and has a stop bar 420 slanting upwardly. The stop bar 420 can provide users with a better operating feel, and provide a point of force for pressing down on the pressing portion 42. When the pressing portion 42 is pressed downward, the cantilever 41 deflects upward around the pivot portion 40 to release a holding effect on the electronic device 200. The locking portion 4 is integrated with the connector body 1, thereby increasing an overall stability of the electrical connector, further facilitating the stable transmission of electrical signals, and also facilitating the simplification of the manufacturing process of the electrical connector 100. Compared with the locking portion provided separately in the prior art, the above structure can save the steps of installation and save the manufacturing cost.

Figure 8:
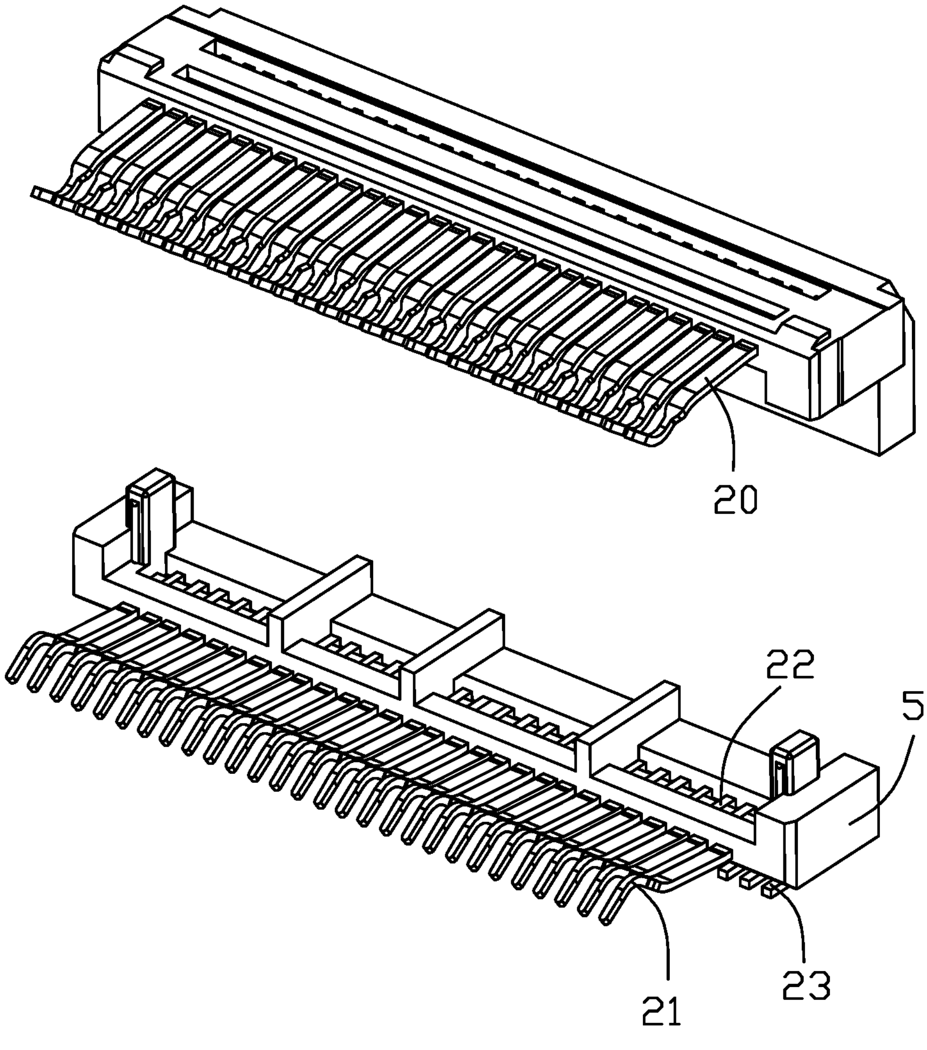
FIG. 8 is an exploded perspective view of two terminal modules in FIG. 7.
Figure 10:
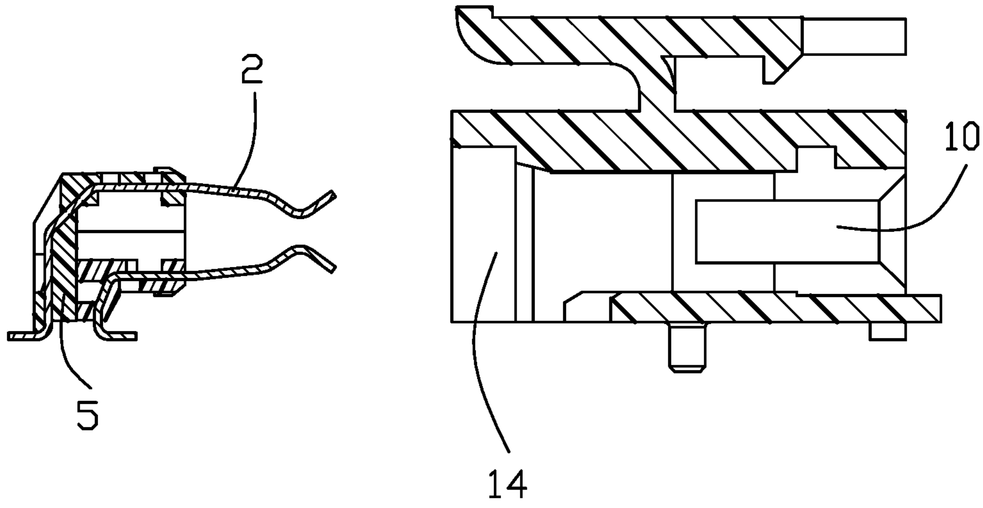
FIG. 10 is a cross-sectional view of the electrical connector in FIG. 7 taken along lines 10-10.

As shown in FIGS. 9-10, the connector housing 1 comprises a accommodating portion 14 behind the mating slot 10. The accommodating portion 14 opens backward and downward. The conductive terminals 2 are fixed in an insulator 5, the resilient arms 20 extend out of the insulator 5. The insulator 5 is assembled in the accommodating portion 14. The resilient arms 20 extend into the mating slot 10 through the terminal grooves 11. Referring to FIG. 8, the electrical connector 100 includes an upper row of the conductive terminals and a lower row of the conductive terminals. The conductive terminal 2 comprises a fixing portion 22 fixed to the insulator 5, a soldering portion 23 extending downward from the fixing portion 22. The resilient arm 20 extends forward from the fixing portion 22.

Referring to FIGS. 3-6, a pair of assembling portion 16 extend outwards from the end walls 13 and are located behind the vertical portion 32. The assembling portion 16 defines a hollow accommodation cavity 160, and a locking member 161 is received in the accommodation cavity 160. A part of the accommodation cavity 160 penetrates downwards, another part of the accommodation cavity 160 not penetrating downwards forms a pad portion 162 for shelving the locking member 161. In this embodiment, the locking member 161 is a nut. The width of the part of the accommodation cavity 160 penetrating downwards is smaller than the width of the nut and larger than the diameter of a through hole of the nut. The electrical connector 100 can be mounted to the printed circuit board 300 by means of a screw (not shown) locked to the nut.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

a connector housing defining a mating slot opening forward and plural terminal grooves on opposite sides of the mating slot;

a plurality of conductive terminals comprising resilient arms received in the terminal grooves;

a positioning portion surrounding the connector housing; and a locking portion located in an opening defined on the positioning portion, the locking portion having a pivot portion and a pair of cantilevers extending forward from the pivot portion;

wherein the positioning portion is spaced from the connector housing with a positioning slot, and the pivot portion of the locking portion, the pair of cantilevers of the locking portion, and the connector housing are integrally formed as one body.

2. The electrical connector as claimed in claim 1, wherein a hook portion is formed at a free end of each cantilever, and the hook portions protrude downwards.

3. The electrical connector as claimed in claim 2, wherein the connector housing comprises a top wall and two end walls connected with the top wall to define the mating slot between the top wall and the end walls, the positioning portion comprises a vertical portion extending integrally from the connector housing and a horizontal portion extending integrally from the vertical portion, and the positioning slot is located between the horizontal portion and the top wall and the end wall.

4. The electrical connector as claimed in claim 3, wherein the locking portion comprises a pressing portion, and the pressing portion extends rearwards from the pivot portion.

5. The electrical connector as claimed in claim 3, wherein the pivot portion and a front face of the vertical portion are arranged in a line.

6. The electrical connector as claimed in claim 1, wherein the connector housing comprises an accommodating portion behind the mating slot, the accommodating portion opens backwards and downwards, the conductive terminals are fixed in an insulator, the resilient arms extend out of the insulator, the insulator is assembled in the accommodating portion, and the resilient arms extend into the mating slot through the terminal grooves.

7. The electrical connector as claimed in claim 6, wherein the conductive terminal comprises a fixing portion fixed to the insulator and a soldering portion extending downward from the fixing portion, and the resilient arm extends forward from the fixing portion.

8. The electrical connector as claimed in claim 3, wherein the connector housing has an assembling portion protruding outwards from the end walls, and the assembling portion is located behind the vertical portion.

9. The electrical connector as claimed in claim 8, wherein the assembling portion comprises a hollow accommodation cavity, a locking member is arranged in the accommodation cavity, only a part of the accommodation cavity penetrates downwards to form a pad portion for shelving the locking member, and a width of the accommodation cavity above the pad portion is wider than a width of the locking member.

10. An electrical connector assembly comprising:
- an electronic device comprising a mating plate with conductive pads and a positioning plate with locking holes; and
- an electrical connector comprising:
  - a connector housing defining a mating slot for insertion of the mating plate of the electronic device;
  - a plurality of conductive terminals arranged in the mating slot and adjacent to opposite sides of the mating slot; and
  - a positioning slot surrounding the connector housing for insertion of the positioning plate of the electronic device;
- wherein a locking portion extends from the connector housing and has hook portions protruding into the locking holes of the electronic device, and the locking portion and the connector housing are integrally formed as one body.

11. The electrical connector assembly as claimed in claim 10, wherein a positioning portion integrally extends from the connector housing, the positioning slot is defined between the positioning portion and the connector housing, and the positioning portion defines an opening for receiving the locking portion.

12. The electrical connector assembly as claimed in claim 11, wherein the locking portion comprises a pair of cantilevers, and the hook portions protrude downward from distal ends of the cantilevers.

13. The electrical connector assembly as claimed in claim 10, wherein the connector housing comprises a top wall, a bottom wall, and two end walls together defining the mating slot, the positioning portion comprises a vertical portion extending integrally from the connector housing and a horizontal portion extending integrally forward from the vertical portion, and the positioning slot is located between the horizontal portion and the top wall and the end wall.

14. An electrical connector comprising:
- a connector housing comprising a mating slot opening forward and surrounded by a top wall, a bottom wall, and two end walls thereof;
- two terminal modules assembled in the connector housing, each terminal module comprising a row of terminals and an insulator retaining the row of terminals, the terminals comprise contacting portions protruding in the mating slot and arranged adjacent to inner sides of the top wall and the bottom wall of the connector housing;
- a positioning portion integrally extending from the connector housing and a positioning slot defined between the connector housing and the positioning portion; and
- a locking portion extending from the connector housing;
- wherein the locking portion and the connector housing are integrally formed as one body, the locking portion defines a pair of hook portions protruding towards the top wall, the positioning portion defines an opening, and the locking portion is located in the opening.

15. The electrical connector as claimed in claim 14, wherein the locking portion comprises a pivot portion integral with the connector housing, a pair of cantilevers with hook portions extending forward from the pivot portion, and a pressing portion extending rearwards from the pivot portion.

16. The electrical connector as claimed in claim 14, wherein the positioning portion comprises a vertical portion extending integrally from the top wall and a horizontal portion extending integrally forward from the vertical portion, the positioning slot is located between the horizontal portion and the top wall, and the pivot portion and the vertical portion are arranged in a line.

* * * * *